United States Patent
Chen et al.

(10) Patent No.: US 11,277,292 B2
(45) Date of Patent: Mar. 15, 2022

(54) PROCESSING METHOD AND DEVICE FOR RECEIVING SIGNAL, RECEIVING EQUIPMENT AND STORAGE MEDIUM

(71) Applicant: XI'AN ZHONGXING NEW SOFTWARE CO., LTD., Shaanxi (CN)

(72) Inventors: Shijun Chen, Guangdong (CN); Dawei Chen, Guangdong (CN); Yuanyuan Wang, Guangdong (CN); Qiang Chen, Guangdong (CN); Quan Yuan, Guangdong (CN); Shiyong Wu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/638,247

(22) PCT Filed: Jul. 31, 2018

(86) PCT No.: PCT/CN2018/097764
§ 371 (c)(1),
(2) Date: Feb. 11, 2020

(87) PCT Pub. No.: WO2019/029396
PCT Pub. Date: Feb. 14, 2019

(65) Prior Publication Data
US 2020/0169445 A1 May 28, 2020

(30) Foreign Application Priority Data
Aug. 11, 2017 (CN) .......................... 201710687138.7

(51) Int. Cl.
*H04L 27/26* (2006.01)
*H04L 25/03* (2006.01)

(52) U.S. Cl.
CPC .... *H04L 27/2636* (2013.01); *H04L 25/03006* (2013.01); *H04L 27/2607* (2013.01); *H04L 2025/03783* (2013.01)

(58) Field of Classification Search
CPC ........... H04L 27/2636; H04L 25/03006; H04L 27/2607; H04L 2025/03783
See application file for complete search history.

(56) References Cited

U.S. PATENT DOCUMENTS

2007/0281654 A1* 12/2007 Choi .................... H04B 7/0857
455/277.1
2009/0010367 A1* 1/2009 Ojard .................... H04B 1/719
375/346

(Continued)

FOREIGN PATENT DOCUMENTS

CN 1805329 A 7/2006
CN 101192867 A 6/2008

(Continued)

OTHER PUBLICATIONS

International Search Report for the International Patent Application No. PCT/CN2018/097764, dated Oct. 23, 2018, 2 pages.

(Continued)

*Primary Examiner* — Duc C Ho
(74) *Attorney, Agent, or Firm* — Kacvinsky Daisak Bluni PLLC

(57) ABSTRACT

Provided is a received signal processing method. The method includes: determining a range of symbol data in a received signal in a time domain; conducting signal integrity evaluation on the received signal within the range of the symbol data; and extracting signal data from the range of the symbol data according to a result of the signal integrity evaluation. Also provided is an apparatus, receiving device and storage medium.

15 Claims, 3 Drawing Sheets

(56) References Cited

U.S. PATENT DOCUMENTS

| | | |
|---|---|---|
| 2015/0055631 A1 | 2/2015 | Ghosh |
| 2016/0149726 A1* | 5/2016 | Hombs et al. |
| 2016/0242103 A1* | 8/2016 | Mindru ............... H04L 27/2663 |
| 2017/0033887 A1* | 2/2017 | Lei ........................ H04L 1/0002 |

FOREIGN PATENT DOCUMENTS

| | | |
|---|---|---|
| CN | 101258761 A | 9/2008 |
| CN | 101779190 A | 7/2010 |
| CN | 102223225 A | 10/2011 |
| CN | 102324997 A | 1/2012 |
| EP | 2141876 A2 | 1/2010 |
| EP | 2200245 A1 | 6/2010 |
| WO | 2004077684 A2 | 9/2004 |

OTHER PUBLICATIONS

Chinese Search Report for Application No. 2017106871387, dated Mar. 22, 2021, 3 pages.
Chinese Office Action for Application No. 2017106871387, dated Mar. 22, 2021, 3 pages.
European Search Report and Written Opinion for the EP Application No. EP18844073, dated Mar. 23, 2021, 7 pages.

* cited by examiner

PROCESSING METHOD AND DEVICE FOR RECEIVING SIGNAL, RECEIVING EQUIPMENT AND STORAGE MEDIUM

CROSS-REFERENCE TO RELATED APPLICATIONS

This is a National Stage Application, filed under 35 U.S.C. 371, of International Patent Application No. PCT/CN2018/097764, filed on Jul. 31, 2018, which claims priority to Chinese patent application No. 201710687138.7 filed on Aug. 11, 2017, contents of both of which are incorporated herein by reference in their entireties.

TECHNICAL FIELD

The present disclosure relates to the field of wireless communications and, in particular, to a received signal processing method and apparatus, receiving device and storage medium.

BACKGROUND

The 4th Generation mobile communication technology (4G) wireless system is an Orthogonal Frequency Division Multiplexing (OFDM) system, and is a communication system based on Fast Fourier Transformation (FFT). To solve inter-symbol interference (ISI), a Cyclic Prefix (CP) is added into each symbol to be transmitted. The size of the CP is mainly determined according to a coverage radius of a base station.

After receiving time domain data, a receiving end needs to remove the CP from the time domain data, and then conducts FFT on the time domain data without the CP to a frequency domain. In the existing receiving end of the wireless system, after conducting Analog-to-Digital Convert (ADC) sampling, the receiving end conducts synchronous channel detection. After determining a wireless frame header, the receiving end removes the CP from each symbol of each subframe, and then conducts the FFT on the each symbol of the each subframe.

In the related art, a frame header is first determined, and then an OFDM symbol is defined. From a time point at which the OFDM symbol is defined, a fixed number (i.e., the size of the CP) of sampling points are removed according to the size of the CP, to obtain symbol time domain data (i.e., time domain signal data). This is applicable in a single-path environment. However, in complex multipath environments such as indoors and dense urban areas, the ISI caused by multipath occurs, resulting in degradation of demodulation performance.

SUMMARY

The present disclosure is directed to provide a received signal processing method and apparatus, which may avoid the ISI in a multipath environment, so as to improve the receiving performance of a receiving device.

The present disclosure provides a received signal processing method. The method includes steps described below.

A range of symbol data in a received signal is determined in a time domain.

Signal integrity evaluation is conducted on the received signal within the range of the symbol data.

Signal data is extracted from the range of the symbol data according to a result of the signal integrity evaluation.

The present disclosure provides a received signal processing apparatus. The apparatus includes a symbol range determination module, a signal integrity evaluation module and a signal data extraction module.

The symbol range determination module is configured to determine a range of symbol data in a received signal in a time domain.

The signal integrity evaluation module is configured to conduct signal integrity evaluation on the received signal within the range of the symbol data.

The signal data extraction module is configured to extract signal data from the range of the symbol data according to a result of the signal integrity evaluation.

The present disclosure provides a receiving device. The device includes a memory, a processor and a received signal processing program stored in the memory and executed on the processor. The received signal processing program, when executed by the processor, implements steps of the above received signal processing method.

The present disclosure provides a storage medium. A received signal processing program is stored in the storage medium. The received signal processing program, when executed by a processor, implements steps of the above received signal processing method.

According to the received signal processing method and apparatus, receiving device and storage medium provided by the present disclosure, the range of the symbol data in the received signal is scoped in the time domain, the signal integrity evaluation is conducted within the range of the symbol data, and the signal data is extracted from the range of the symbol data according to the result of the signal integrity evaluation. It may be ensured that the received signal on which the FFT processing is to be conducted is complete multipath data through the signal integrity evaluation, and the received signal is not mixed with data of the previous symbol or data of the next symbol. Therefore, the ISI in the multipath environment is avoided and the receiving performance of the receiving device is improved.

DETAILED DESCRIPTION

Figure 1:
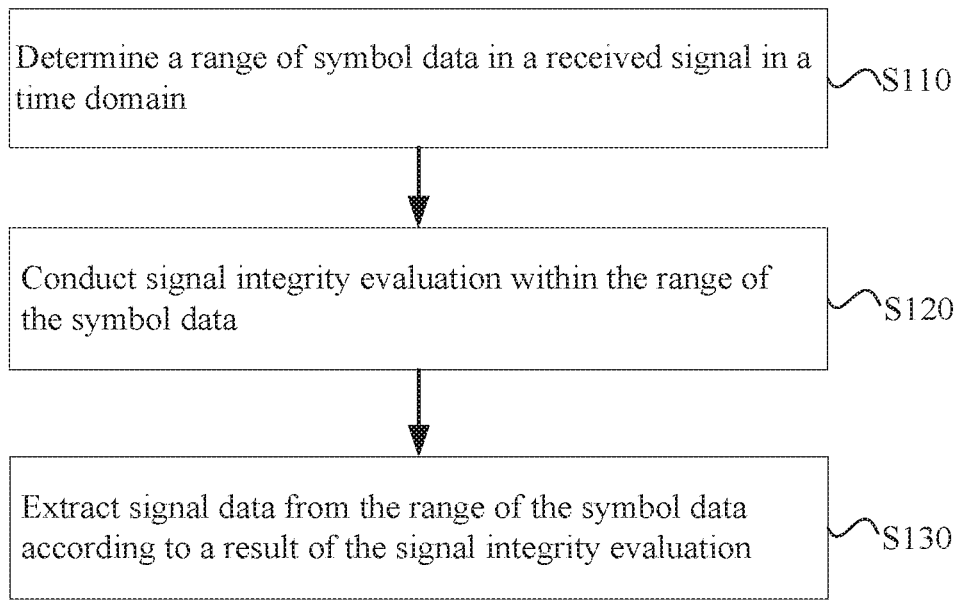
FIG. 1 is a flowchart of a received signal processing method according to an embodiment of the present disclosure.

When the applicant implements a received signal processing method in the related art, it is found that, in the related art, a CP of a fixed size is removed from a header of symbol data. Due to the existence of multipath, an estimated starting point of the CP for a part of the multipath may be earlier or later than a time point when the CP actually arrives. Therefore, when the FFT processing is conducted on this symbol, the data of the previous symbol or the data of the next symbol is introduced, that is, the ISI is caused. Therefore, the receiving performance is affected. Based on this, the embodiment of the present disclosure provides a received signal processing method. As shown in FIG. 1, the received signal processing method provided by the embodiment of the present disclosure includes steps describe below.

In a step S110, a range of symbol data in a received signal is determined in a time domain.

In a step S120, signal integrity evaluation is conducted within the range of the symbol data.

In a step S130, signal data is extracted from the range of the symbol data according to a result of the signal integrity evaluation.

The method may further include features described below.

In an implementation, the step in which the range of the symbol data in the received signal is determined in the time domain includes steps described below.

Calculation is conducted on the received signal according to a synchronization channel to obtain a frame header timing signal of a wireless frame.

It is counted from the frame header timing signal of the wireless frame according to at least one parameter of a subframe number, a symbol number, a length of a subframe, a length of a symbol or a sampling period, and sampling data corresponding to the subframe number and the symbol number is extracted.

The frame header timing signal in a 4G system is a 10 ms frame timing signal. The frame header timing signal in a 5G system is a frame period timing signal specified by the 5G.

In an implementation, the step in which the signal integrity evaluation is conducted within the range of the symbol data includes steps described below.

Data of first L sampling points of the symbol data $a_n$ is searched for a multipath stable time point k, where $0 \leq n \leq CP\_SIZ+FFT\_SIZE-1$. The step in which the data of the first L sampling points of the symbol data an is searched for the multipath stable time point k includes steps described below.

A first sequence $b_i$ is constructed according to the first L sampling points of the symbol data $a_n$, where $b_i=a_i-a_{i+FFT\_SIZE}$, $0 \leq i \leq L-1$, i is a sequence number of a sampling point and i is an integer. $a_n$ is an amplitude sampling value of a sampling point of the symbol data in the time domain, CP_SIZE is a size of a CP, FFT_SIZE is a size of FFT, $L=u*CP\_SIZE$, u is a coefficient, and u is greater than or equal to 1.

The first sequence $b_i$ is searched for the multipath stable time point k meeting a first condition. The first condition includes that an absolute value of each element in the first sequence $b_i$ starting from a sequence number k is less than or equal to a threshold value A, namely, $|b_j| \leq A$, $k \leq j \leq L-1$, where j is a sequence number of a sampling point and j is an integer.

Signal integrity refers that each path in the received data includes complete FFT_SIZE period data, namely, although a starting point of receiving data for the each path is not necessarily the same, each path includes the complete FFT_SIZE period data.

The multipath stable time point refers that, starting from the multipath stable time point, the number of received paths thereafter no longer changes.

In an implementation, the threshold value A may be computed according to noise power. For example, the threshold value A may be determined according to the ratio of channel noise power to signal power.

In an implementation, the step in which the signal data is extracted from the range of the symbol data according to the result of the signal integrity evaluation includes steps described below.

FFT_SIZE consecutive sampling points starting from the multipath stable time point k within the range of the symbol data $a_n$ are determined as data $c_t$ meeting a signal integrity requirement.

The data $c_t$ meeting the signal integrity requirement is extracted from the range of the symbol data $a_n$, and an FFT operation is conducted on the data $c_t$, where $c_t=a_{t+k}$, $t \in [0, FFT\_SIZE-1]$, t is a sequence number of a sampling point and t is an integer.

In an embodiment, the method further includes a step described below.

Data of a sampling point followed by the data $c_t$ meeting the signal integrity requirement within the range of the symbol data $a_n$ is determined as data $d_q$ to be discarded, and a discard processing is conducted on the data $d_q$, where $d_q=a_{q+k+FFT\_SIZE}$, $q \in [0, m]$, $m=CP\_SIZE-k$, q is a sequence number of a sampling point and q is an integer.

Figure 2:
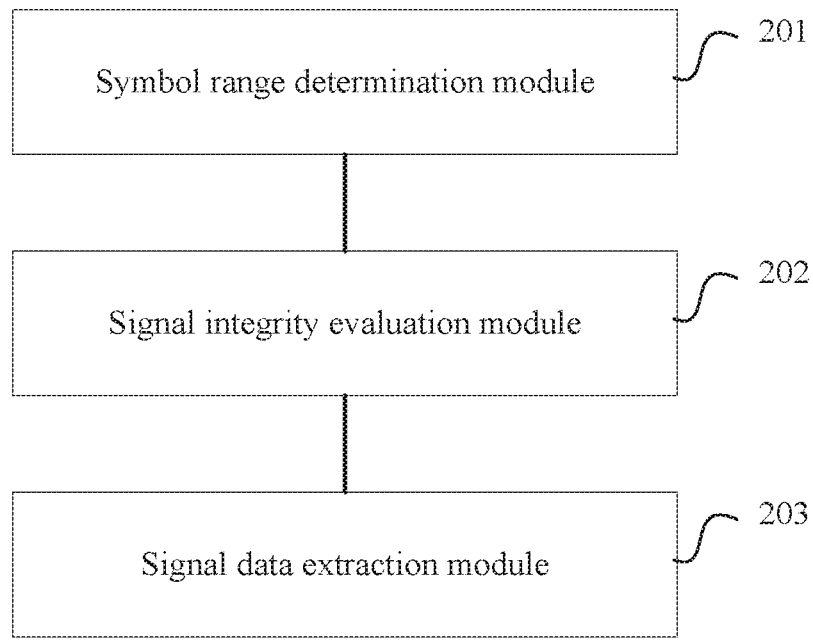
FIG. 2 is a schematic diagram of a received signal processing apparatus according to an embodiment of the present disclosure.

As shown in FIG. 2, the embodiment of the present disclosure provides a received signal processing apparatus. The apparatus includes a symbol range determination module 201, a signal integrity evaluation module 202 and a signal data extraction module 203.

The symbol range determination module 201 is configured to determine the range of the symbol data in the received signal in the time domain.

The signal integrity evaluation module 202 is configured to conduct the signal integrity evaluation within the range of the symbol data.

The signal data extraction module 203 is configured to extract the signal data from the range of the symbol data according to the result of the signal integrity evaluation.

In an implementation, the signal integrity evaluation module is configured to conduct the signal integrity evaluation within the range of the symbol data through a following operation.

The data of the first L sampling points of the symbol data an is searched for the multipath stable time point k, where $0 \leq n \leq CP\_SIZE+FFT\_SIZE-1$. The operation in which the data of the first L sampling points of the symbol data $a_n$ is searched for the multipath stable time point k includes operations described below.

The first sequence $b_i$ is constructed according to the first L sampling points of the symbol data $b_i$, where $b_i=a_i-a_{i+FFT\_SIZE}$, $0 \leq i \leq L-1$, i is a sequence number of a sampling point and i is an integer. $a_n$ is an amplitude sampling value of a sampling point of the symbol data in the time domain, the CP_SIZE is the size of the CP, the FFT_SIZE is the size of the FFT, $L=u*CP\_SIZE$, u is the coefficient, and u is greater than or equal to 1.

The first sequence $b_i$ is searched for the multipath stable time point k meeting the first condition. The first condition includes that the absolute value of the each element in the first sequence $b_i$ starting from the sequence number k is less than or equal to the threshold value A, namely, $|b_j| \leq A$, $k \leq j \leq L-1$, where j is a sequence number of a sampling point and j is an integer.

In an implementation, the signal data extraction module is configured to extract the signal data from the range of the symbol data according to the result of the signal integrity evaluation through a following operation.

The FFT_SIZE consecutive sampling points starting from the multipath stable time point k within the range of the symbol data an are determined as the data $c_t$ meeting the signal integrity requirement.

The data $c_t$ meeting the signal integrity requirement is extracted from the range of the symbol data $a_n$, and the FFT operation is conducted on the data $c_t$, where $c_t=a_{t+k}$, $t\in[0, \text{FFT\_SIZE}-1]$, t is a sequence number of a sampling point and t is an integer.

In an implementation, the signal data extraction module is further configured to determine the data of the sampling point followed by the data $c_t$ meeting the signal integrity requirement within the range of the symbol data $a_n$ as the data $d_q$ to be discarded, and conduct the discard processing on the data $d_q$, where q is a sequence number of a sampling point and q is an integer.

In an implementation, the symbol range determination module is configured to determine the range of the symbol data in the received signal in the time domain through a following operation.

The calculation is conducted on the received signal according to the synchronization channel to obtain the frame header timing signal of the wireless frame.

It is counted from the frame header timing signal of the wireless frame according to the at least one parameter of the subframe number, the symbol number, the length of the subframe, the length of the symbol or the sampling period, and the sampling data corresponding to the subframe number and the symbol number is extracted.

The embodiment of the present disclosure provides a receiving device.

The device includes a memory, a processor and received signal processing programs stored in the memory and executed on the processor. The received signal processing programs, when executed by the processor, implement the steps of the following received signal processing method: the range of the symbol data in the received signal is determined in the time domain; the signal integrity evaluation is conducted within the range of the symbol data; the signal data is extracted from the range of the symbol data according to the result of the signal integrity evaluation.

In an implementation, the step in which the range of the symbol data in the received signal is determined in the time domain includes steps described below.

The calculation is conducted on the received signal according to the synchronization channel to obtain the frame header timing signal of the wireless frame.

It is counted from the frame header timing signal of the wireless frame according to the at least one parameter of the subframe number, the symbol number, the length of the subframe, the length of the symbol or the sampling period, and the sampling data corresponding to the subframe number and the symbol number is extracted.

The frame header timing signal in the 4G system is the 10 ms frame timing signal. The frame header timing signal in the 5G system is the frame period timing signal specified by the 5G.

In an implementation, the step in which the signal integrity evaluation is conducted within the range of the symbol data includes steps described below.

The data of the first L sampling points of the symbol data an is searched for the multipath stable time point k, where $0\leq n\leq \text{CP\_SIZE}+\text{FFT\_SIZE}-1$. The step in which the data of the first L sampling points of the symbol data $a_n$ is searched for the multipath stable time point k includes steps described below.

The first sequence $b_i$ is constructed according to the first L sampling points of the symbol data $a_n$, where $b_i=a_i-a_{i+\text{FFT\_SIZE}}$, $0\leq i\leq L-1$, i is a sequence number of a sampling point and i is an integer. $a_n$ is an amplitude sampling value of a sampling point of the symbol data in the time domain, the CP\_SIZE is the size of the CP, the FFT\_SIZE is the size of the FFT, $L=u*\text{CP\_SIZE}$, u is the coefficient, and u is greater than or equal to 1.

The first sequence $b_i$ is searched for the multipath stable time point k meeting the first condition. The first condition includes that the absolute value of the each element in the first sequence $b_i$ starting from the sequence number k is less than or equal to the threshold value A, namely, $|b_j|\leq A$, $k\leq j\leq L-1$, where j is a sequence number of a sampling point and j is an integer.

The signal integrity refers that the each path in the received data includes the complete FFT\_SIZE period data, namely, although the starting point of receiving data for the each path is not necessarily the same, the each path includes the complete FFT\_SIZE period data.

The multipath stable time point refers that, starting from the multipath stable time point, the number of received paths thereafter no longer changes.

In an implementation, the threshold value A may be computed according to the noise power. For example, the threshold value A may be determined according to the ratio of the channel noise power to the signal power.

In an implementation, the step in which the signal data is extracted from the range of the symbol data according to the result of the signal integrity evaluation includes steps described below.

The FFT\_SIZE consecutive sampling points starting from the multipath stable time point k within the range of the symbol data $a_n$ are determined as the data $c_t$ meeting the signal integrity requirement.

The data $c_t$ meeting the signal integrity requirement is extracted from the range of the symbol data $a_n$, and the FFT operation is conducted on the data $c_t$, where $c_t=a_{t+k}$, $t\in[0, \text{FFT\_SIZE}-1]$, t is a sequence number of a sampling point and t is an integer.

In an implementation, the method further includes steps described below.

The data of the sampling point followed by the data $c_t$ meeting the signal integrity requirement within the range of the symbol data $a_n$ is determined as the data $d_q$ to be discarded, and the discard processing is conducted on the data $d_q$, where $d_q=a_{q+k+\text{FFT\_SIZE}}$, $q\in[0, m]$, $m=\text{CP\_SIZE}-k$, q is a sequence number of a sampling point and q is an integer.

In an implementation, the receiving device may be a terminal or a base station.

Figure 3:
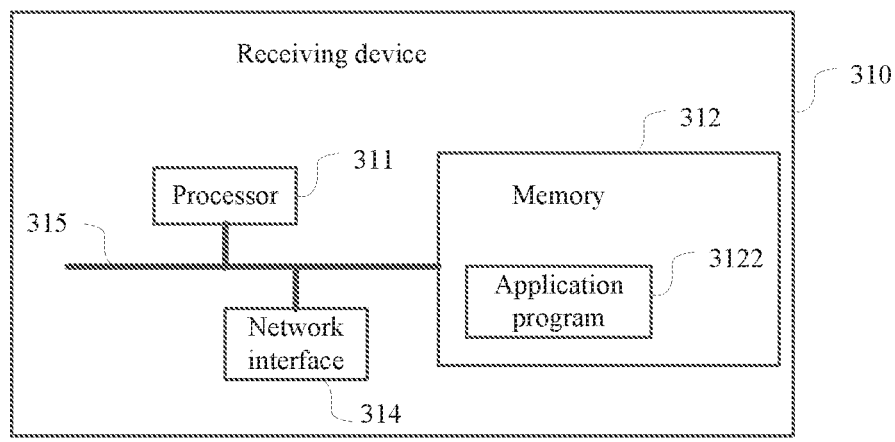
FIG. 3 is a structural diagram of hardware of a receiving device according to an embodiment of the present disclosure.

FIG. 3 is a structural diagram of hardware composition of the receiving device. As shown in FIG. 3, the receiving device 310 includes at least one processor 311, a memory 312 and at least one network interface 314. The various components in the receiving device 310 are coupled together by a bus system 315. It should be understood that the bus system 315 is configured to implement the connection communication between these components. The bus system 315 includes a power bus, a control bus, and a status signal bus in addition to a data bus. However, for clarity of illustration, the various buses are labeled as the bus system 315 in FIG. 3.

It should be understood that the memory 312 may be volatile memory or nonvolatile memory, or may be both the volatile memory and the nonvolatile memory. The nonvolatile memory may be a Read Only Memory (ROM), Programmable Read-Only Memory (PROM), Erasable Programmable Read-Only Memory (EPROM), Electrically Erasable Programmable Read-Only Memory (EEPROM), ferromagnetic random access memory (FRAM), Flash Memory, magnetic surface memory, disk or Compact Disc Read-Only Memory (CD-ROM). The magnetic surface memory may be a disk storage or a tape storage. The volatile memory may be a Random Access Memory (RAM), which is used as an external cache. Many forms of RAM, such as a Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM) are available by way of example but not limitation. The memory 312 described in the embodiment of the present disclosure is intended to include, but is not limited to, these memories and any other suitable type of memory.

The memory 312 in the embodiment of the present disclosure is used for storing various types of data to support the operations of the receiving device 310. Examples of the various types of data include any computer program, such as an application program 3122, operated on the receiving device 310. Programs for implementing the method in the embodiment of the present disclosure may be included in the application program 3122.

The method disclosed in the above embodiment of the present disclosure may be applied to the processor 311 or implemented by the processor 311. The processor 311 may be an integrated circuit chip with signal processing capacity. In an implementation process, the steps of the above method may be completed by the integrated logic circuit in a hardware form or instructions in a software form in the processor 311. The above processor 311 may be a general processor, a Digital Signal Processor (DSP) or other programmable logic devices, discrete gates or transistor logic devices, discrete hardware components, etc. The processor 311 may implement or execute various methods, steps and logic block diagrams disclosed in the embodiment of the present disclosure. The general processor may be a microprocessor or any conventional processor. The steps of the method disclosed in the embodiment of the present disclosure may be directly implemented by a hardware decoding processor, or may be implemented by a combination of hardware and software modules in the decoding processor. The software modules may be located in a storage medium, and the storage medium is located in the memory 312. The processor 311 reads information in the memory 312, and completes the steps of the above method in combination with the hardware of the processor 51.

In an exemplary embodiment, the receiving device 310 may be configured by at least one application specific integrated circuit (ASIC), DSP, Programmable Logic Device (PLD), Complex Programmable Logic Device (CPLD), field-programmable gate arrays (FPGA), general processor, controller, micro controller unit (MCU), microprocessor, or other electronic elements for executing the method described above.

The embodiment of the present disclosure provides a storage medium. Received signal processing programs are stored in the storage medium. The received signal processing programs, when executed by a processor, implement the steps of the following received signal processing method: the range of the symbol data in the received signal is determined in the time domain; the signal integrity evaluation is conducted within the range of the symbol data; the signal data is extracted from the range of the symbol data according to the result of the signal integrity evaluation.

In an implementation, the step in which the range of the symbol data in the received signal is determined in the time domain includes steps described below.

The calculation is conducted on the received signal according to the synchronization channel to obtain the frame header timing signal of the wireless frame.

It is counted from the frame header timing signal of the wireless frame according to the at least one parameter of the subframe number, the symbol number, the length of the subframe, the length of the symbol or the sampling period, and the sampling data corresponding to the subframe number and the symbol number is extracted.

The frame header timing signal in the 4G system is the 10 ms frame timing signal. The frame header timing signal in the 5G system is the frame period timing signal specified by the 5G.

The step in which the signal integrity evaluation is conducted within the range of the symbol data includes steps described below.

The data of the first L sampling points of the symbol data $a_n$ is searched for the multipath stable time point k, where $0 \leq n \leq CP\_SIZE+FFT\_SIZE-1$. The step in which the data of the first L sampling points of the symbol data $a_n$ is searched for the multipath stable time point k includes steps described below.

The first sequence $b_i$ is constructed according to the first L sampling points of the symbol data $a_n$, where $b_i=a_i-a_{i+FFT\_SIZE}$, $0 \leq i \leq L-1$, i is a sequence number of a sampling point and i is an integer. $a_n$ is an amplitude sampling value of a sampling point of the symbol data in the time domain, the CP_SIZE is the size of the CP, the FFT_SIZE is the size of the FFT, L=u*CP_SIZE, u is the coefficient, and u is greater than or equal to 1.

The first sequence $b_i$ is searched for the multipath stable time point k meeting the first condition. The first condition includes that the absolute value of the each element in the first sequence $b_i$ starting from the sequence number k is less than or equal to the threshold value A, namely, $|b_j| \leq A$, $k \leq j \leq L-1$, where j is a sequence number of a sampling point and j is an integer.

The signal integrity refers that the each path in the received data includes the complete FFT_SIZE period data, namely, although the starting point of receiving data for the each path is not necessarily the same, the each path includes the complete FFT_SIZE period data.

The multipath stable time point refers that, starting from the multipath stable time point, the number of received paths thereafter no longer changes.

In an implementation, the threshold value A may be computed according to the noise power. For example, the threshold value A may be determined according to the ratio of the channel noise power to the signal power.

In an implementation, the step in which the signal data is extracted from the range of the symbol data according to the result of the signal integrity evaluation includes steps described below.

The FFT_SIZE consecutive sampling points starting from the multipath stable time point k within the range of the symbol data an are determined as the data $c_t$ meeting the signal integrity requirement.

The data $c_t$ meeting the signal integrity requirement is extracted from the range of the symbol data $a_n$, and the FFT operation is conducted on the data $c_t$, where $c_t=a_{t+k}$, $t \in [0, FFT\_SIZE-1]$, t is a sequence number of a sampling point and t is an integer.

In an embodiment, the method further includes steps described below.

The data of the sampling point followed by the data $c_t$ meeting the signal integrity requirement within the range of the symbol data $a_n$ is determined as the data $d_q$ to be discarded, and the discard processing is conducted on the data $d_q$, where $d_q=a_{q+k+FFT\_SIZE}$, $q\in[0, m]$, $m=CP\_SIZE-k$, q is a sequence number of a sampling point and q is an integer.

An application scenario of the received signal processing method according to this application is explained below.

In an implementation, a terminal, which is located indoors, receives a positioning reference signal (PRS), conducts a CP removing processing on the PRS, and performs steps described below.

In a step 101, a range of symbol data in a received signal is determined in a time domain.

The terminal scopes an OFDM symbol range through a primary synchronization signal (PSS) and a secondary synchronization signal (SSS). The step in which the terminal scopes the OFDM symbol range through the PSS and the SSS includes a step described below.

Calculation is conducted on the received signal according to a synchronization channel to obtain a frame header timing signal. It is counted from the frame header timing signal according to at least one parameter of a subframe number, a symbol number, a length of a subframe, a length of a symbol or a sampling period, and sampling data corresponding to the subframe number and the symbol number is extracted.

In a step S102, signal integrity evaluation is conducted within the range of the symbol data.

Data of first L sampling points of the symbol data an is searched for a multipath stable time point k, where $0 \leq n \leq CP\_SIZE+FFT\_SIZE-1$.

The multipath stable time point k meets a condition of a following formula (1-1):

$$\begin{cases} b_i = a_i - a_{i+FFT\_SIZE} & i \in [0, L-1] \\ |b_j| \leq A, & k \leq j \leq L-1 \end{cases} \quad (1\text{-}1)$$

$$L = u * CP\_SIZE$$

In the formula (1-1), $a_n$ is an amplitude sampling value of a sampling point of the symbol data in the time domain, CP_SIZE is a size of a CP, FFT_SIZE is a size of FFT, A is a threshold value, u is a coefficient, u is greater than or equal to 1, and each of i, j, k, and n is a sequence number of a sampling point and is an integer.

Figure 4:
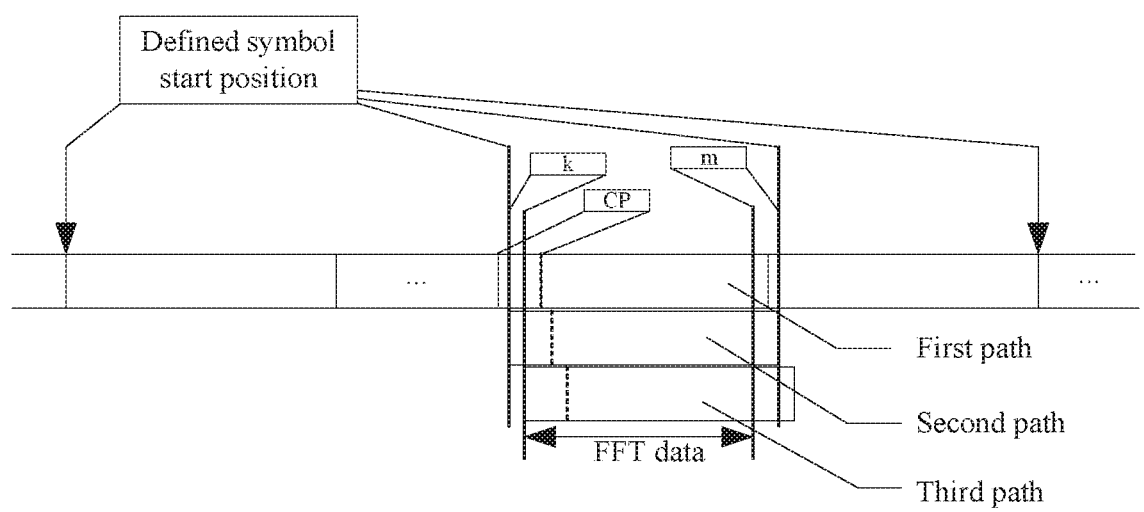
FIG. 4 is a schematic diagram of multipath receiving according to an embodiment of the present disclosure.

As shown in FIG. 4, it is assumed that the terminal receives data of three paths. For data of the first path, a starting position of a CP actually received comes before a symbol start position defined by the terminal. For data of the second path, a starting position of a CP actually received starts exactly at the symbol start position defined by the terminal. For data of the third path, a starting position of a CP actually received comes later than the symbol start position defined by the terminal.

Figure 5:
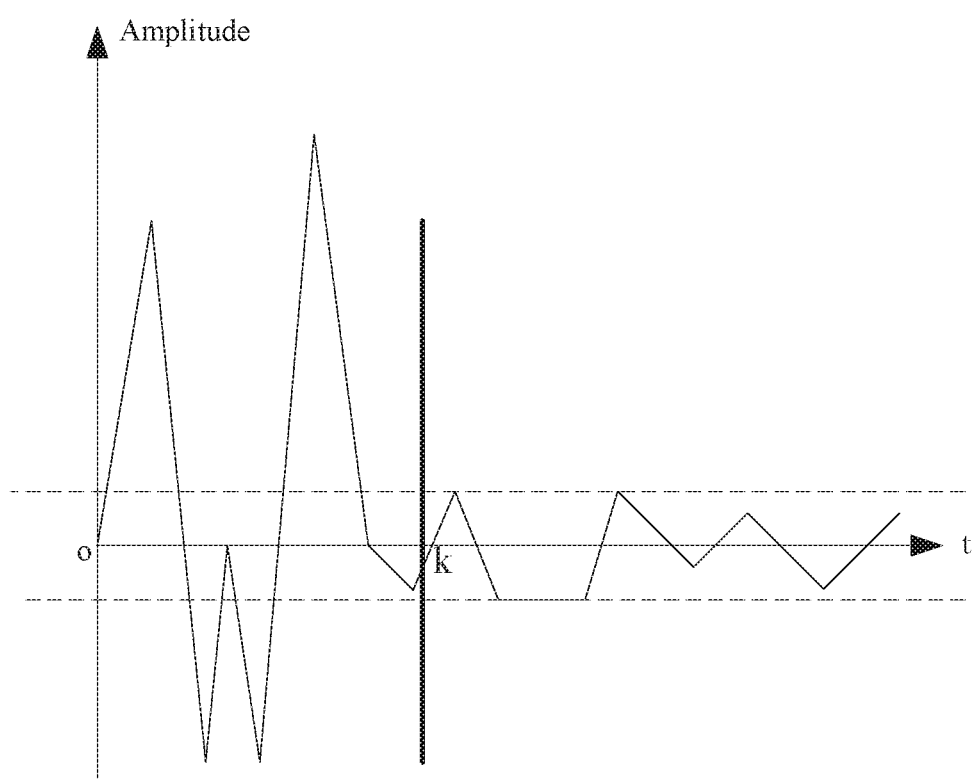
FIG. 5 is a schematic diagram of multipath stable time points according to an embodiment of the present disclosure.

As shown in FIG. 5, the multipath stable time point k refers that, starting from the multipath stable time point k, the number of received paths thereafter no longer changes, namely, the number of paths is no longer increasing and no longer decreasing.

In a subframe, the size of the CP may be varies according to the position of the symbol. For example, for the first symbol and the eighth symbol of the subframe, the size of the CP (CP_SIZE) may be 160, and for other symbols of the subframe, the size of the CP (CP_SIZE) may be 144.

In the 4G system, when the bandwidth of the 4G system is 20M, the size of the FFT may be 2048.

In a step S103, signal data is extracted from the range of the symbol data.

Starting from the multipath stable time point k, FFT_SIZE sampling points $c_t$ are consecutively extracted for the FFT processing, where the FFT_SIZE sampling points $c_t$ meet the signal integrity requirement, and data $d_q$ of m sampling points followed by the data $c_t$ are discarded.

The signal data $c_t$ may be represented through a following formula (1-2):

$$c_t = a_{t+k}, t \in [0, FFT\_SIZE-1] \quad (1\text{-}2)$$

In the formula (1-2), t is a sequence number of a sampling point and t is an integer.

The data $d_q$ to be discarded may be represented through a following formula (1-3):

$$d_q = a_{q+k+FFT\_SIZE}, q \in [0, m]$$

$$m = CP\_SIZE - k \quad (1\text{-}3)$$

In the formula (1-3), q is a sequence number of a sampling point and q is an integer.

In another implementation, the terminal is positioned indoors, receives a PRS transmitted from multiple base stations, and obtains a synchronization clock according to a synchronization channel. Arrival time of signals from the multiple positioning base stations may be before or after the synchronization clock. The terminal conducts the CP removing processing on the PRS, and executes steps described below.

In a step S201, a range of symbol data in a received signal is determined in a time domain.

The terminal conducts detection of a frame header of a wireless frame through a PSS and an SSS included in the synchronization channel to determine a start position of the frame header of the wireless frame (i.e., a frame header timing signal). According to a signal bandwidth, sampling rate, etc., it is counted from the frame header timing signal, and sampling data corresponding to the subframe and the symbol is extracted. The frame header timing signal is a synchronization clock signal synchronously obtained by the synchronization channel.

In a step S202, signal integrity evaluation is conducted within the range of the symbol data.

Data of first L sampling points of the symbol data $a_n$ is searched for a multipath stable time point k, where $0 \leq n \leq CP\_SIZE+FFT\_SIZE-1$.

The multipath stable time point k meets a condition of a following formula (1-1):

$$\begin{cases} b_i = a_i - a_{i+FFT\_SIZE} & i \in [0, L-1] \\ |b_j| \leq A, & k \leq j \leq L-1 \end{cases} \quad (1\text{-}1)$$

$$L = u * CP\_SIZE$$

In the formula (1-1), an is an amplitude sampling value of a sampling point of the symbol data in the time domain, CP_SIZE is a size of a CP, FFT_SIZE is a size of FFT, A is a threshold value, u is a coefficient, u is greater than or equal to 1, and each of i, j, k, and n is a sequence number of a sampling point and is an integer.

The signal integrity is detected backwards to the synchronous clock signal relatively, and signals earlier than the synchronous clock do not need to be processed. Generally, the signals from the multiple positioning base stations are relatively delayed within one CP_SIZE, so the multipath stable time k may be found within the range of one CP_SIZE.

In a step 203, signal data is extracted from the range of the symbol data.

Starting from the multipath stable time point k, FFT_SIZE sampling points $c_t$ are consecutively extracted for the FFT processing, where the FFT_SIZE sampling points $c_t$ meet the signal integrity requirement, and data $d_q$ of m sampling points followed by the data $c_t$ are discarded.

The signal data $c_t$ may be represented through a following formula (1-2):

$$c_t = a_{t+k}, t \in [0, FFT\_SIZE-1] \quad (1\text{-}2)$$

In the formula (1-2), t is a sequence number of a sampling point and t is an integer.

The data $d_q$ to be discarded may be represented through a following formula (1-3):

$$d_q = a_{q+k+FFT\_SIZE}, [0,m] \quad$$

$$m = CP\_SIZE - k \quad (1\text{-}3)$$

In the formula (1-3), q is a sequence number of a sampling point and q is an integer.

It should be noted that, the present disclosure may have other various embodiments. Corresponding changes and modifications may be made by those skilled in the art according to the present disclosure without departing from the spirit and essence of the present disclosure. However, these corresponding changes and modifications fall within the scope of the claims in the present disclosure.

INDUSTRIAL APPLICABILITY

According to the embodiment of the present disclosure, the range of the symbol data in the received signal is determined in the time domain, the signal integrity evaluation is conducted on the received signal within the range of the symbol data, and the signal is extracted from the range of the symbol data according to the result of the signal integrity evaluation. In this way, it may be ensured that the received signal on which the FFT processing is to be conducted is complete multipath data, and the received signal is not mixed with data of the previous symbol or data of the next symbol. Therefore, the ISI in the multipath environment is avoided and the receiving performance of the receiving device is improved.

What is claimed is:

1. A received signal processing method, comprising:
   determining a range of symbol data in a received signal in a time domain;
   conducting signal integrity evaluation on the received signal within the range of the symbol data; and
   extracting signal data from the range of the symbol data according to a result of the signal integrity evaluation,
   wherein conducting the signal integrity evaluation on the received signal within the range of the symbol data comprises:
   searching data of first L sampling points of the symbol data $a_n$ for a multipath stable time point k, wherein $0 \leq n \leq CP\_SIZE + FFT\_SIZE - 1$;
   wherein searching the data of the first L sampling points of the symbol data $a_n$ for the multipath stable time point k comprising:
   constructing a first sequence $b_i$ according to the first L sampling points of the symbol data $a_n$, wherein $b_i = a_i - a_{i+FFT\_SIZE}$, $0 \leq i \leq L-1$, i is a sequence number of a sampling point and i is an integer, wherein $a_n$ is an amplitude sampling value of a sampling point of the symbol data in the time domain, CP_SIZE is a size of a Cyclic Prefix (CP), FFT_SIZE is a size of Fast Fourier Transformation (FFT), L=u*CP_SIZE, u is a coefficient, and u is greater than or equal to 1; and
   searching the first sequence $b_i$ for the multipath stable time point k meeting a first condition, wherein the first condition comprises: an absolute value of each element in the first sequence $b_i$ starting from a sequence number k being less than or equal to a threshold value A, namely, $|b_j| \leq A$, $k \leq j \leq L-1$, wherein j is a sequence number of a sampling point and j is an integer.

2. The method of claim 1, wherein extracting the signal data from the range of the symbol data according to the result of the signal integrity evaluation comprises:
   determining FFT_SIZE consecutive sampling points starting from the multipath stable time point k within the range of the symbol data $a_n$ as data $c_t$ meeting a signal integrity requirement; and
   extracting the data $c_t$ meeting the signal integrity requirement from the range of the symbol data $a_n$, and conducting an FFT operation on the data $c_t$;
   wherein $c_t = a_{t+k}$, $t \in [0, FFT\_SIZE-1]$, t is a sequence number of a sampling point and t is an integer.

3. The method of claim 2, further comprising:
   determining data of a sampling point followed by the data $c_t$ meeting the signal integrity requirement within the range of the symbol data $a_n$ as data $d_q$ to be discarded, and conducting a discard processing on the data $d_q$;
   wherein $d_q = a_q + k + FFT\_SIZE$, $q \in [0, m]$, $m = CP\_SIZE - k$, q is a sequence number of a sampling point and q is an integer.

4. The method of claim 3, wherein determining the range of the symbol data in the received signal in the time domain comprises:
   conducting calculation on the received signal according to a synchronization channel to obtain a frame header timing signal of a wireless frame; and
   counting from the frame header timing signal of the wireless frame according to at least one parameter of a subframe number, a symbol number, a length of a subframe, a length of a symbol or a sampling period, and extracting sampling data corresponding to the subframe number and the symbol number.

5. The method of claim 2, wherein determining the range of the symbol data in the received signal in the time domain comprises:
   conducting calculation on the received signal according to a synchronization channel to obtain a frame header timing signal of a wireless frame; and
   counting from the frame header timing signal of the wireless frame according to at least one parameter of a subframe number, a symbol number, a length of a subframe, a length of a symbol or a sampling period, and extracting sampling data corresponding to the subframe number and the symbol number.

6. The method of claim 1, wherein determining the range of the symbol data in the received signal in the time domain comprises:
   conducting calculation on the received signal according to a synchronization channel to obtain a frame header timing signal of a wireless frame; and
   counting from the frame header timing signal of the wireless frame according to at least one parameter of a subframe number, a symbol number, a length of a subframe, a length of a symbol or a sampling period, and extracting sampling data corresponding to the subframe number and the symbol number.

7. A received signal processing apparatus, comprising:
a processor; and
a memory for storing instructions executable by the processor,
wherein when executing the instructions, the processor is configured to:
determine a range of symbol data in a received signal in a time domain;
conduct signal integrity evaluation on the received signal within the range of the symbol data; and
extract signal data from the range of the symbol data according to a result of the signal integrity evaluation,
wherein the processor is configured to conduct the signal integrity evaluation within the range of the symbol data through a manner of:
searching data of first L sampling points of the symbol data $a_n$ for a multipath stable time point k, wherein $0 \leq n \leq CP\_SIZ+FFT\_SIZE-1$;
wherein searching the data of the first L sampling points of the symbol data $a_n$ for the multipath stable time point k comprising:
constructing a first sequence $b_i$ according to the first L sampling points of the symbol data $a_n$, wherein $b_i=a_i-a_{i+FFT\_SIZE}$, $0 \leq i \leq L-1$, i is a sequence number of a sampling point and i is an integer, wherein $a_n$ is an amplitude sampling value of a sampling point of the symbol data in the time domain, CP_SIZE is a size of a Cyclic Prefix (CP), FFT_SIZE is a size of Fast Fourier Transformation (FFT), L=u*CP_SIZE, u is a coefficient, and u is greater than or equal to 1; and
searching the first sequence $b_i$ for the multipath stable time point k meeting a first condition, wherein the first condition comprises: an absolute value of each element in the first sequence $b_i$ starting from a sequence number k being less than or equal to a threshold value A, namely, $|b_j| \leq A$, $k \leq j \leq L-1$, wherein j is a sequence number of a sampling point and j is an integer.

8. The apparatus of claim 7, wherein
the processor is configured to extract the signal data from the range of the symbol data according to the result of the signal integrity evaluation through a manner of:
determining FFT_SIZE consecutive sampling points starting from the multipath stable time point k within the range of the symbol data $a_n$ as data $c_t$ meeting a signal integrity requirement; and
extracting the data $c_t$ meeting the signal integrity requirement from the range of the symbol data $a_n$, and conducting $a_n$ FFT operation on the data $c_t$;
wherein $c_t=a_{t+k}$, $t \in [0, FFT\_SIZE-1]$, t is a sequence number of a sampling point and t is an integer.

9. The apparatus of claim 8, wherein
the processor is further configured to determine data of a sampling point followed by the data $c_t$ meeting the signal integrity requirement within the range of the symbol data $a_n$ as data $d_q$ to be discarded, and conduct a discard processing on the data $d_q$;
wherein $d_q=a_{q+k+FFT\_SIZE}$, $q \in [0, m]$, m=CP_SIZE-k, q is a sequence number of a sampling point and q is $a_n$ integer.

10. The apparatus of claim 9, wherein
the processor is configured to determine the range of the symbol data in the received signal in the time domain through a manner of:
conducting calculation on the received signal according to a synchronization channel to obtain a frame header timing signal of a wireless frame; and
counting from the frame header timing signal of the wireless frame according to at least one parameter of a subframe number, a symbol number, a length of a subframe, a length of a symbol or a sampling period, and extracting sampling data corresponding to the subframe number and the symbol number.

11. The apparatus of claim 8, wherein
the processor is configured to determine the range of the symbol data in the received signal in the time domain through a manner of:
conducting calculation on the received signal according to a synchronization channel to obtain a frame header timing signal of a wireless frame; and
counting from the frame header timing signal of the wireless frame according to at least one parameter of a subframe number, a symbol number, a length of a subframe, a length of a symbol or a sampling period, and extracting sampling data corresponding to the subframe number and the symbol number.

12. The apparatus of claim 7, wherein
the processor is configured to determine the range of the symbol data in the received signal in the time domain through a manner of:
conducting calculation on the received signal according to a synchronization channel to obtain a frame header timing signal of a wireless frame; and
counting from the frame header timing signal of the wireless frame according to at least one parameter of a subframe number, a symbol number, a length of a subframe, a length of a symbol or a sampling period, and extracting sampling data corresponding to the subframe number and the symbol number.

13. A receiving device, comprising:
a memory;
a processor; and
a received signal processing program, which is stored on the memory and is executed by the processor,
wherein the received signal processing program, when executed by the processor, implements a received signal processing method,
wherein the method comprises:
determining a range of symbol data in a received signal in a time domain;
conducting signal integrity evaluation on the received signal within the range of the symbol data; and
extracting signal data from the range of the symbol data according to a result of the signal integrity evaluation,
wherein conducting the signal integrity evaluation on the received signal within the range of the symbol data comprises:
searching data of first L sampling points of the symbol data $a_n$ for a multipath stable time point k, wherein $0 \leq n \leq CP\_SIZE+FFT\_SIZE-1$;
wherein searching the data of the first L sampling points of the symbol data $a_n$ for the multipath stable time point k comprising:
constructing a first sequence $b_i$ according to the first L sampling points of the symbol data $a_n$, wherein $b_i=a_i-a_{i+FFT\_SIZE}$, $0 \leq i \leq L-1$, i is a sequence number of a sampling point and i is an integer, wherein $a_n$ is $a_n$ amplitude sampling value of a sampling point of the symbol data in the time domain, CP_SIZE is a size of a Cyclic Prefix (CP), FFT_SIZE is a size of Fast Fourier Transformation (FFT), L=u*CP_SIZE, u is a coefficient, and u is greater than or equal to 1; and
searching the first sequence $b_i$ for the multipath stable time point k meeting a first condition, wherein the first condition comprises: $a_n$ absolute value of each element in the first sequence $b_j$ starting from a sequence number k being less than or equal to a threshold value A, namely, $|b_j| \leq A$, $k \leq j \leq L-1$, wherein j is a sequence number of a sampling point and j is an integer.

14. The receiving device of claim 13, wherein extracting the signal data from the range of the symbol data according to the result of the signal integrity evaluation comprises:
   determining FFT_SIZE consecutive sampling points starting from the multipath stable time point k within the range of the symbol data $a_n$ as data $c_t$ meeting a signal integrity requirement; and
   extracting the data $c_t$ meeting the signal integrity requirement from the range of the symbol data $a_n$, and conducting $a_n$ FFT operation on the data $c_t$;
wherein $c_t = a_{t+k}$, $t \in [0, FFT\_SIZE-1]$, t is a sequence number of a sampling point and t is an integer.

15. A non-transitory storage medium, wherein a received signal processing program is stored in the non-transitory storage medium, the received signal processing program, when executed by a processor, implements steps of the received signal processing method of claim 1.

* * * * *

UNITED STATES PATENT AND TRADEMARK OFFICE
CERTIFICATE OF CORRECTION

PATENT NO. : 11,277,292 B2
APPLICATION NO. : 16/638247
DATED : March 15, 2022
INVENTOR(S) : Shijun Chen et al.

It is certified that error appears in the above-identified patent and that said Letters Patent is hereby corrected as shown below:

In the Claims (1) In Column 12, Line 31, Claim 3, amend the $d_q=a_q+k+FFT\_SIZE$ to "$d_q=a_{q+k+FFT\_SIZE}$";

(2) In Column 13, Line 50, Claim 8, amend the $a_n$ FFT to "an FFT"; and (3) In Column 15, Line 15, Claim 14, amend the $a_n$ FFT to "an FFT".

Signed and Sealed this
Thirty-first Day of May, 2022

Katherine Kelly Vidal
*Director of the United States Patent and Trademark Office*